United States Patent
Bar Bracha

(10) Patent No.: US 9,497,720 B2
(45) Date of Patent: Nov. 15, 2016

(54) APPARATUS, METHOD AND SYSTEM OF SYNCHRONIZING BETWEEN WIRELESS COMMUNICATION DEVICES

(71) Applicant: INTEL CORPORATION, Santa Clara, CA (US)

(72) Inventor: Vered Bar Bracha, Hod HaSharon (IL)

(73) Assignee: INTEL CORPORATION, Santa Clara, CA (US)

( * ) Notice: Subject to any disclaimer, the term of this patent is extended or adjusted under 35 U.S.C. 154(b) by 130 days.

(21) Appl. No.: 14/582,947

(22) Filed: Dec. 24, 2014

(65) Prior Publication Data

US 2016/0192302 A1 Jun. 30, 2016

(51) Int. Cl.
*H04W 56/00* (2009.01)
*H04W 52/02* (2009.01)
*H04L 1/16* (2006.01)
*H04W 88/02* (2009.01)

(52) U.S. Cl.
CPC .......... *H04W 56/001* (2013.01); *H04L 1/1678* (2013.01); *H04W 52/0212* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 7,539,889 B2* | 5/2009 | Celinski | ..................... | G06F 1/12 713/400 |
| 8,634,341 B1* | 1/2014 | Vleugels | .................... | G06F 5/16 370/324 |
| 9,386,552 B2* | 7/2016 | Mandiganal | ...... | H04W 56/0015 |
| 2007/0226530 A1* | 9/2007 | Celinski | ..................... | G06F 1/12 713/500 |
| 2009/0228732 A1* | 9/2009 | Budde | .................... | H04B 7/269 713/400 |
| 2012/0117180 A1* | 5/2012 | Ranasinghe | .......... | H04J 3/0667 709/208 |
| 2012/0155497 A1* | 6/2012 | Lee | ........................ | H04J 3/0697 370/507 |
| 2013/0343365 A1* | 12/2013 | Hollabaugh | .......... | H04W 56/00 370/338 |
| 2014/0219269 A1* | 8/2014 | Vleugels | ................... | G06F 5/16 370/350 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Eunsook Choi
(74) *Attorney, Agent, or Firm* — Shichrur & Co.

(57) ABSTRACT

Some demonstrative embodiments include devices, systems and methods of synchronizing between wireless communication devices. For example, a wireless communication device may include a clock to count a local time; a controller to count a virtual master clock corresponding to a group of wireless communication devices according to master clock information defining the virtual master clock, the controller to determine a time drift between the local clock and the virtual master clock, and to determine the virtual master clock based on the local time and the time drift; and a radio to communicate with one or more devices of the group of wireless communication devices a synchronization frame including a master clock time stamp of the virtual master clock.

25 Claims, 5 Drawing Sheets

(56) References Cited

OTHER PUBLICATIONS

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wi-Fi Alliance Technical Committee P2P Task Group; Wi-Fi Peer-to-Peer (P2P) Technical Specification; Version 1.2; Dec. 14, 2011; 160 pages.

Bluetooth Specification Version 4.1, Specification of the Bluetooth System, Covered Core Package version: 4.1, Dec. 3, 2013, 2684 pages.

R.Colin Johnson; EE Times; "MEMS Clock Cuts Wearable Power in Half"; Jun. 4, 2014; 4 pages.

\* cited by examiner

APPARATUS, METHOD AND SYSTEM OF SYNCHRONIZING BETWEEN WIRELESS COMMUNICATION DEVICES

TECHNICAL FIELD

Embodiments described herein generally relate to synchronizing between wireless communication devices.

BACKGROUND

A wireless communication device, e.g., a mobile device, may include a real-time clock, e.g., a 32 Kilohertz (kHz) real-time clock, to keep track of time, and to provide a clock signal to one or more elements of the wireless communication device, for example, to communicate with one or more other wireless communication devices, to cause one or more elements of the wireless communication device to "wake up" from a reduced power mode, and/or to perform one or more other operations.

Most real-time clocks have a precision of 100 to 250 parts per million (PPM), which may be adequate to keep a device from seeming unresponsive or "sluggish".

The wireless communication device may be configured to perform clock synchronization operations and communications to enable communication with another device.

In one example, a Bluetooth device may communicate over a slotted channel according to a Time-Division Duplex (TDD) scheme, e.g., to support full duplex transmission. According to a Bluetooth communication scheme, information is exchanged between devices through frames, each frame being transmitted on a different hop frequency. A frame nominally covers a single slot, but can be extended to cover up to five slots. For a mobile device, even in idle mode, a Bluetooth radio is turned on, and wakes up every few seconds for a period long enough to make sure no paired device is wishing to transfer data.

In another example, in a power save mode (PSM) of a Wireless Local Area Network (WLAN), e.g., according to the IEEE 802.11 standards, time is divided into periods called beacon intervals. A Timing Synchronization Function (TSF) uses beacons to synchronize clocks among stations to ensure that all stations wake up at the same time. A device may be required to perform often scans to detect the beacons.

Even a small clock drift, e.g., a drift of 20 PPM, may require buffer time to make sure that devices are connected properly before data is transferred.

It has been shown that clock synchronization between devices may account for about 50% of a power consumption of some devices, e.g., wearable devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
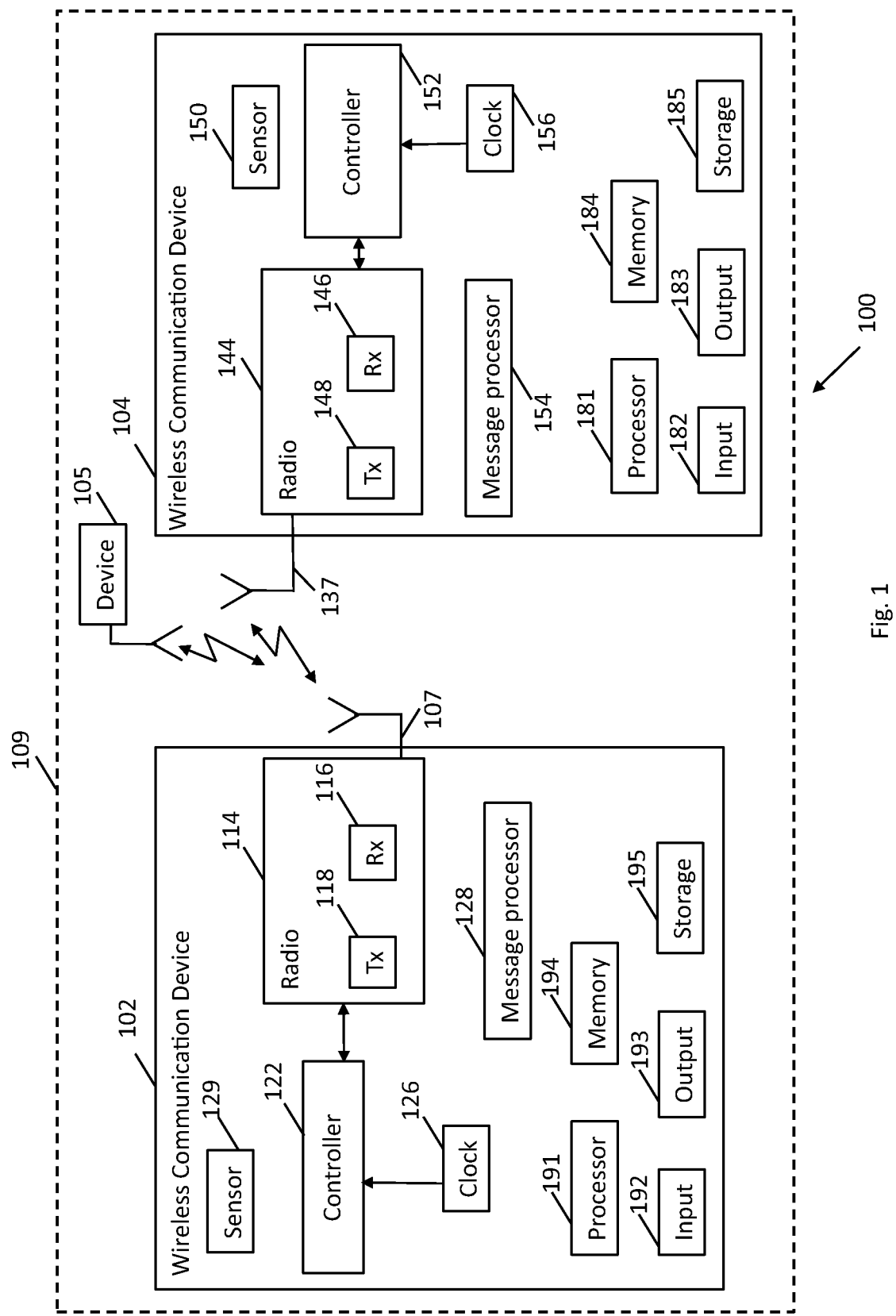
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a mobile or portable device, an Internet of Things (IoT) device, a wearable device, a handheld device, a User Equipment (UE), a Mobile Device (MD), a wireless Station (STA), a computing device, an Ultrabook™, a mobile computer, a laptop computer, a notebook computer, a tablet computer, a handheld computer, a Personal Digital Assistant (PDA) device, a handheld PDA device, an on-board device, an off-board device, a hybrid device, a vehicular device, a non-vehicular device, a consumer device, a wireless communication station, a wireless communication device, a video device, an audio device, an audio-video (A/V) device, a wireless network, a wireless area network, a Wireless Video Area Network (WVAN), a Wireless LAN (WLAN), a Wireless PAN (WPAN), a Bluetooth (BT) device, a Wireless Fidelity (Wi-Fi) device, a cellular device, and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012*"); IEEE802.11ac-2013 (*"IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad (*"IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec. 2012); IEEE 802.11Revmc; IEEE 802.11x) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.2, 2012*) and/or future versions and/or derivatives thereof, devices and/or networks operating in accordance with existing Bluetooth standards, e.g., including "*Bluetooth specification V 1.0*", Dec. 1, 1991, "*Bluetooth specification V 4.0*", Jun. 30, 2010, and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, and the like.

Some embodiments may be used in conjunction with one way and/or two-way radio communication systems, a WLAN device, a WiFi device, a Bluetooth device, a BLE device, cellular radio-telephone communication systems, a mobile device, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM). For example, system 100 may include a wireless communication device 102, a wireless communication device 104, and/or a wireless communication device 105.

In some demonstrative embodiments, devices 102, 104 and/or 105 may include, for example, a mobile device or a non-mobile, e.g., a static, device. For example, devices 102, 104 and/or 105 may include, for example, a UE, an MD, a STA, an AP, a PC, an IoT device, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, at least one of devices 102, 104 and 105 may include a mobile or portable device.

In some demonstrative embodiments, at least one of devices 102, 104 and 105 may include a mobile or portable device and at least one of device 102 and 104 may include a non-portable device. For example, one of devices 102, 104 and 105 may include a mobile device, e.g., a portable computer or a mobile phone, and another one of devices 102, 104 and 105 may include a docking device or another stationary device, e.g., a wireless display.

In some demonstrative embodiments, each of devices 102, 104 and 105 may include a mobile or portable device.

In some demonstrative embodiments, devices 102, 104, and/or 105 may include one or more radios including circuitry and/or logic to perform wireless communication between devices 102, 104, 105 and/or one or more other wireless communication devices. For example, device 102 may include at least one radio 114, and/or device 104 may include at least one radio 144 to perform wireless communication, e.g., as described below.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, circuitry, logic, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 137, respectively.

In one example, device 102 may include a single antenna 107. In other example, device 102 may include two or more antennas 107.

In one example, device 104 may include a single antenna 137. In other example, device 104 may include two or more antennas 137.

Antennas 107 and/or 137 may include any type of antennas suitable for transmitting and/or receiving wireless communication signals, blocks, frames, transmission streams, packets, messages and/or data. For example, antennas 107 and/or 137 may include any suitable configuration, structure and/or arrangement of one or more antenna elements, components, units, assemblies and/or arrays. Antennas 107 and/or 137 may include, for example, antennas suitable for directional communication, e.g., using beamforming techniques. For example, antennas 107 and/or 137 may include a phased array antenna, a multiple element antenna, a set of switched beam antennas, and/or the like. In some embodiments, antennas 107 and/or 137 may implement transmit and receive functionalities using separate transmit and receive antenna elements. In some embodiments, antennas 107 and/or 137 may implement transmit and receive functionalities using common and/or integrated transmit/receive elements.

In some demonstrative embodiments, devices 102, 104 and/or 105 may include a clock (also referred to as "local clock" or "internal clock") including circuitry and/or logic to count a local time. For example, device 102 may include a clock 126 to count a local time at device 102, and/or device 104 may include a clock 156 to count a local clock at device 104.

In some demonstrative embodiments, clock 126 may include a real-time clock, e.g., a 32 Kilohertz (kHz) real-time clock or any other clock, to keep track of time, and to provide a clock signal to one or more elements of device 126; and/or clock 156 may include a real-time clock, e.g., a 32 Kilohertz (kHz) real-time clock or any other clock, to keep track of time, and to provide a clock signal to one or more elements of device 104.

In some demonstrative embodiments, device 102 may include, for example, one or more of a processor 191, an input unit 192, an output unit 193, a memory unit 194, and a storage unit 195, and/or device 104 may include, for example, one or more of a processor 181, an input unit 182, an output unit 183, a memory unit 184, and a storage unit 185. Devices 102 and/or 104 may optionally include other suitable hardware components and/or software components. In some demonstrative embodiments, some or all of the components of one or more of devices 102 and/or 104 may be enclosed in a common housing or packaging, and may be interconnected or operably associated using one or more wired or wireless links. In other embodiments, components of one or more of devices 102 and/or 104 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 104 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 104.

In some demonstrative embodiments, a plurality of wireless communication devices, e.g., including devices 102, 104 and/or 105, may be configured to form and/or communicate as part of a wireless communication network 109, e.g., as described below.

In some demonstrative embodiments, wireless communication network 109 may include an ad-hoc network.

In some demonstrative embodiments, wireless communication network 109 may include a Wireless Personal Area Network (WPAN).

In some demonstrative embodiments, wireless communication network 109 may include a network (also referred to as "MyPAN") of a plurality of wireless communication devices, for example, a group of wireless communication devices, e.g., including devices 102, 104 and/or 105, e.g., as described below.

In some demonstrative embodiments, the MyPAN may include a plurality of devices, which may be grouped together and/or associated with the MyPAN based on one or more criteria and/or characteristics, e.g., as described below.

In some demonstrative embodiments, the MyPAN may include a private network configured to communicate between a group of wireless communication devices in a private and/or secure manner, e.g., as described below.

In other embodiments, wireless communication network 109 may include any other wireless communication network.

Some demonstrative embodiments may exploit singular entity characteristics to create a private network between devices belonging to an entity, for example, to enhance power consumption and/or security, for example, in a scenario and/or environment when "everything is connected, and everything is mine", e.g., as described below.

In some demonstrative embodiments, wireless communication network 109 may include a MyPAN defined between devices belonging to a single user. For example, wireless communication network 109 may include a MyPAN defined between one or more telephones ("MyPhone") belonging to the user, one or more mobile devices ("MyMobile") belonging to the user, and/or one or more wearable devices ("MyWearables") belonging to the user, e.g., smart glasses, earphones, a headset, a smart watch, and the like.

In some demonstrative embodiments, wireless communication network 109 may include a MyPAN defined between devices belonging to a common organization or group of people, e.g., devices belonging to employees of a company, devices belonging to members of a family, devices belonging to a group of friends, devices belonging to a group of students, e.g., students in a class, students in a school, students in a university, and the like, devices belonging to customers of a retail store, and/or any other group of users.

In some demonstrative embodiments, wireless communication network 109 may include a MyPAN defined based on location, e.g., the MyPAN may be defined between devices belonging to a user space. For example, wireless communication network 109 may include a MyPAN defined between devices being in a car ("MyCAR"), a MyPAN defined between devices being in a home location ("MyHome"), a MyPAN defined between devices being in an office ("MyOffice"), a MyPAN defined between devices being in lecture hall, a MyPAN defined between devices being in a conference room, and the like.

In some demonstrative embodiments, wireless communication devices 102, 104, and/or 105 may include personal devices, for example, devices belonging to and/or carried by, a user.

In one example, a user may carry multiple devices, e.g., cell phones, Smartphones, tablets, laptops, headphones, wearable devices, e.g., a smart watch, smart glasses, a headset, an IoT device, and the like. According to this example, wireless communication devices 102, 104, and 105 may include personal devices of the same user.

In other embodiments, devices 102, 104 and/or 105 may include devices belonging to different users.

In some demonstrative embodiments, devices of network 109, e.g., devices 102, 104 and/or 105, may be configured to communicate in network 109 according to a virtual master clock (also referred to as "MySync clock"), e.g., as described below.

In some demonstrative embodiments, the virtual master clock may include a virtual master Time Synchronization Function (TSF). In other embodiments, the virtual master clock may include any other clock and/or timing functionality.

In some demonstrative embodiments, devices 102, 104 and/or 105 may be configured to determine the virtual master clock, synchronize to the virtual master clock, and/or to communicate in network 109 according to the virtual master clock, e.g., as described below.

In some demonstrative embodiments, a member of the MyPAN network 109, e.g., device 102, 104 and/or 105, may be configured to count the virtual master clock, for example, according to information ("master clock information") defining the virtual master clock, e.g., as described below.

In some demonstrative embodiments, the master clock information may be defined, for example, upon setting up and/or initialization of network 109, e.g., as described below.

In one example, the virtual master clock may be defined at a device, e.g., device 102, for example, if the MyPAN 109 is being defined at device 102, e.g., as described below.

In some demonstrative embodiments, another device, e.g., device 104 and/or 105, may be configured to determine and/or acquire the master clock information defining the virtual master clock, for example, upon joining MyPAN 109, e.g., upon registration, as described below.

In some demonstrative embodiments, a device (the "MyPAN device") belonging to MyPAN 109, e.g., devices 102, 104 and/or 105, may be configured to maintain synchronization to the MySync clock, for example, for as long as the MyPAN device belongs to the MyPAN 109. For example, the MyPAN device may maintain synchronization to the virtual master clock, when the MyPAN device is connected to MyPAN 109, when the MyPAN device is re-connecting to the MyPAN 109, e.g., after the MyPAN device has been disconnected from MyPAN 109, when the MyPAN device is activated after being in a sleep mode, and/or even when switching the WPAN device on, e.g., after the MyPAN device has been powered-off, e.g., even for a long period of time, as described below.

In some demonstrative embodiments, the MyPAN device may be configured to calculate and/or correct, e.g., continuously and/or dynamically, a drift between a local clock of the MyPAN device the MySync virtual clock and, e.g., as described below.

In some demonstrative embodiments, the virtual master clock may be defined based on a master clock seed, e.g., as described below.

In some demonstrative embodiments, the master clock information may include seed information configured to enable determining and/or extracting the master clock seed.

In one example, the seed information may include a value of the master clock seed.

In another example, the seed information may include information configured to enable determining the master clock seed, for example, as a permutation of the seed information, for example, based on the seed information alone or any other information.

In some demonstrative embodiments, the master clock seed may include a dedicated seed ("MySeed") defined with respect to MyPAN 109. In other embodiments, the master clock seed may be shared between a plurality of MyPANs.

In some demonstrative embodiments, the master clock seed may include a secret or protected seed, which may be based on secret information ("MySecret") corresponding to the MyPAN, e.g., as described below.

In some demonstrative embodiments, the secret information may include biometric information, a secret key, an encryption key ("MyEncryption private key"), and/or any other secret and/or protected information.

In some demonstrative embodiments, the MyPAN secret information may be shared between the MyPAN devices of MyPAN 109 in a protected manner, for example, only during initial registration into MyPAN 109. For example, the MyPAN secret information may be provided to a MyPAN device, while a physical contact to a source of the MySeed is maintained, e.g., for enhanced MyPAN security.

In some demonstrative embodiments, the virtual master clock may be defined based on a permutation of an organic seed, e.g., as described below.

In some demonstrative embodiments, the master clock seed may be based on biological information, for example, of a user.

In one example, the master clock seed may be based on biometric information of a user of at least one device of the group of wireless communication devices forming MyPAN network 109, e.g., a user of one or more of devices 102, 104 and 105.

In another example, the master clock seed may be based on biometric information of any other user, e.g., an administrator defining the MyPAN 109 for devices 102, 104 and 105.

In some demonstrative embodiments, the biometric information may include, or may be based on, an electric biosignature of the user, for example, a Natural BioDynamic Signature (BDSTM) of the user.

In one example, the biometric information may include, or may be based on, Fingerprint information of the user, Iris information of the user, Voice information of the user, and the like.

In some demonstrative embodiments, the master clock seed may be defined based on any other singular or non-singular source or value.

In one example, the master clock seed may be defined, for example, based on a clock value of a device belonging to the MyPAN 109, e.g., the internal clock 126 of device 102. For example, device 102 may include a Smartphone, and a user of the Smartphone may define a virtual master clock to be based on an internal clock 126 of device 102.

In some demonstrative embodiments, devices 102, 104 and/or 105 may include a controller to count the virtual master clock corresponding to network 109, for example, according to the master clock information defining the virtual master clock, e.g., as described below.

For example, device 102 may include a controller 122 to count the virtual master clock corresponding to network 109, and/or device 104 may include a controller 152 to count the virtual master clock corresponding to network 109, e.g., as described below.

In some demonstrative embodiments, controllers 122 and/or 152 may be configured to control one or more communications between devices 102, 104 and/or 105, for example, based on the virtual master clock, and/or one or more communications to define and/or synchronize to the virtual master clock, e.g., as described below.

In some demonstrative embodiments, controller 122 may cause radio 114 to communicate one or more messages, which may be based on the virtual master clock, one or more messages, which may include a time stamp of the virtual master clock, one or more messages, which may include the master clock information, and/or any other messages; and/or controller 152 may cause radio 144 to communicate one or more messages, which may be based on the virtual master clock, one or more messages, which may include a time stamp of the virtual master clock, one or more messages, which may include the master clock information, and/or any other messages, e.g., as described below.

In some demonstrative embodiments, controllers 122 and/or 152 may include circuitry, e.g., one or more processors including circuitry, memory circuitry, Media-Access Control (MAC) circuitry, Physical Layer (PHY) circuitry, and/or any other circuitry, configured to perform the functionality of controllers 122 and/or 152. Additionally or alternatively, one or more functionalities of controllers 122 and/or 152 may be implemented by logic, which may be executed by a machine and/or one or more processors, e.g., as described below.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 104 may include a message processor 154 configured to generate, process and/or access one or messages communicated by device 104.

In one example, message processor 154 may be configured to generate one or more messages to be transmitted by device 104, and/or message processor 154 may be configured to access and/or to process one or more messages received by device 104, e.g., as described below.

In some demonstrative embodiments, message processors 128 and/or 154 may include circuitry, e.g., one or more processors including circuitry, memory circuitry, Media-Access Control (MAC) circuitry, Physical Layer (PHY) circuitry, and/or any other circuitry, configured to perform the functionality of message processors 128 and/or 154. Additionally or alternatively, one or more functionalities of the proximity estimators message processors 128 and/or 154 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 154 may be implemented as part of radio 144.

In some demonstrative embodiments, at least part of the functionality of message processor 128 may be implemented as part of controller 122, and/or at least part of the functionality of message processor 154 may be implemented as part of controller 152.

In other embodiments, the functionality of message processor 128 may be implemented as part of any other element of device 102, and/or the functionality of message processor 154 may be implemented as part of any other element of device 104.

In some demonstrative embodiments, devices 102, 104 and/or 105 may be configured to count the virtual master clock using respective local clocks of devices 102, 104, and/or 105, e.g., as described below.

In some demonstrative embodiments, controller 122 may be configured to determine a time drift between clock 126 and the virtual master clock, and to determine the virtual master clock based on a local time counted by clock 126 and the time drift; and/or controller 152 may be configured to determine a time drift between clock 156 and the virtual master clock, and to determine the virtual master clock based on a local time counted by clock 156 and the time drift, e.g., as described below.

In some demonstrative embodiments, one or more MyPAN devices of the MyPAN 109, e.g., devices 102, 104 and/or 105, may be configured to communicate one or more synchronization ("sync") frames, which may be configured to enable one or more of the MyPAN devices of the MyPAN 109 to synchronize to the virtual master clock, e.g., as described below.

In some demonstrative embodiments, the synchronization frames may include a master clock time stamp of the virtual master clock.

In some demonstrative embodiments, a MyPAN device of the MyPAN 109, e.g., device 102, may perform the functionality of a master station, which may generate and transmit the synchronization frames. For example, message processor 128 may generate the synchronization frames including the master clock time stamp of the virtual master clock determined by controller 122, and transmitter 118 may transmit the synchronization frames, e.g., as part of a broadcast transmission, a unicast transmission, a multicast transmission, or any other transmission.

In some demonstrative embodiments, controller 122 may communicate beacons or any other synchronization frames using time stamps of the virtual master clock, for example, which may be different from, and/or unsynchronized with, time stamps of the local clock 126 of device 102, e.g., as described below.

In some demonstrative embodiments, a MyPAN device of the MyPAN 109, e.g., device 104, may perform the functionality of a non-master station (also referred to as a "Client station"), which may receive the synchronization frames. For example, receiver 146 may receive the synchronization frames, e.g., from device 102. According to this example, message processor 154 may access and/or process the received synchronization frames, and controller 152 may synchronize local clock 156 to the virtual master clock based on the master clock time stamp, e.g., as described below.

In some demonstrative embodiments, controller 122 may be configured to determine the time drift between clock 126 and the virtual master clock, for example, based on one or more time stamps of one or more synchronization frames received from another MyPAN device, e.g., from device 104, as described below.

In some demonstrative embodiments, a MyPAN device, e.g., devices 102, 104, and/or 105, may be configured to perform both the functionality of a master station and a client station, and/or to switch between operating as a master station and operating as a client station, e.g., as described below.

In some demonstrative embodiments, the MyPAN device, e.g., devices 102, 104 and/or 105, may be configured to maintain synchronization to the virtual master clock, for example, even when switching between the functionalities of the master and client stations.

In some demonstrative embodiments, when operating as a master station, a MyPAN device may use time stamps of the virtual master clock, for example, in beacons and/or other scheduling elements, for example, instead of using time stamps of a local clock of the MyPAN device.

In some demonstrative embodiments, radio 114 may receive a first synchronization frame including a first time stamp of the virtual master clock, e.g., from device 104, for example, when device 102 performs the functionality of a client of the MyPAN 109. According to these embodiments, message processor 128 may process the first synchronization frame, and controller 122 may synchronize to the virtual master clock based on the first time stamp.

In some demonstrative embodiments, radio 114 may transmit a second synchronization frame including a second time stamp of the virtual master clock, e.g., to device 104, for example, when device 102 performs the functionality of a master of the MyPAN 109. According to these embodiments, controller 122 may determine the second time stamp, and message processor 128 may generate the second synchronization frame.

In some demonstrative embodiments, synchronizing the MyPAN devices to the virtual master clock may enable maintaining synchronization between the MyPAN devices for a long period of time, for example, even if one or more of the MyPAN devices is disconnected from the wireless medium, even if one or more of the MyPAN devices is switched off, and/or even if one or more of the MyPAN devices is switched to a power save state.

In some demonstrative embodiments, the MyPAN devices of MyPAN 109, e.g., devices 102, 104, and/or 105, may be configured to communicate the synchronization frames according to a synchronization-frame timing scheme (also referred to as "super-frame timing") including a plurality of super-frame time slots, which may be synchronized to the MySync virtual master clock.

In one example, controller 122 may be configured to cause radio 114 to transmit a synchronization frame at a super-frame timing, which may be synchronized to the MySync master clock. According to this example, controller 152 may be configured to cause radio 144 to scan for the synchronization frame during the super-frame timing, which may be synchronized to the MySync master clock.

In some demonstrative embodiments, synchronizing the super-frame timing to the MySync virtual master clock may enable efficient communication of synchronization frames between the MyPAN devices of MyPAN 109 during predicted super-frame time periods, e.g., at an increased level of accuracy.

In some demonstrative embodiments, synchronizing the super-frame timing to the MySync virtual master clock may enable reduced scan time and/or scan power.

In some demonstrative embodiments, synchronization (syncing) between the MyPAN devices of MyPAN 109 and one or more other network devices may be verified, for example, using a periodic sync frame (beacon) transmission by a network element, e.g., using any suitable super-frame (beacon period) timing, e.g., according to the Bluetooth Standards, the Wi-Fi Standards, and the like.

In some demonstrative embodiments, short-term synchronization, e.g., of devices outside MyPAN 109 (non-MyPAN devices) may be achieved, for example, by a non-MyPAN device scanning and syncing to the beacon transmitted by a MyPAN device.

In some demonstrative embodiments, long-term synchronization, for example, enabling a MyPAN device to remain synchronization, e.g., even when disconnected, powered down and/or during sleep, may be achieved, for example, since a MyPAN device acting as a master of MyPAN 109 may generate the sync beacon on a known cadence, which may maintain synchronization to the MySync virtual clock, e.g., as described above. Accordingly, a MyPAN device acting as a client of MyPAN 109 may be able to easily detect the sync beacon, e.g., even without performing a scan or with a very short scan around the super-frame time slot.

In some demonstrative embodiments, a MyPAN device belonging to MyPAN 109, e.g., device 102, may know a-priori a highly accurate time stamp of a next expected sync frame (beacon) of MyPAN 109, e.g., based on the MySync super-frame synchronization maintained buy the MyPAN device, e.g., by controller 122. According to these embodiments, the MyPAN device may operate in a low power mode, or a sleep mode, for example, until a scheduled or event triggered sync frame read is to be performed by the MyPAN device.

In some demonstrative embodiments, the MyPAN devices may utilize the virtual master clock to communicate within the MyPAN 109 messages and/or information, e.g., as part of the MyPAN sync frame and/or within one or more pre-set TX/RX time and/or frequency slots. The information may include, for example, a wakeup schedule, wakeup instructions, updated operation parameters, RX/TX timeslot allocation, RX/TX data, and the like.

In some demonstrative embodiments, controller 122 may be configured to determine (calibrate) the virtual master clock based on the time drift between clock 126 and the virtual master clock, for example, subsequent to disconnection of device 102 from MyPAN 109, and to reconnect to MyPAN 109 using the virtual master clock.

In some demonstrative embodiments, controller 122 may be configured to determine (calibrate) the virtual master clock based on the time drift between clock 126 and the virtual master clock, for example, subsequent to power-down or power-off of device 102, for example, to communicate with the MyPAN devices of MyPAN 109.

In some demonstrative embodiments, the virtual master clock may be protected and/or kept secret between the MyPAN devices of MyPAN 109, for example, to increase a level of privacy and/or secrecy of communications between the MyPAN devices of MyPAN 109, e.g., as described below.

In some demonstrative embodiments, a drift pattern, which may be known to the MyPAN devices of MyPAN 109, may be applied to the virtual master clock. The drift pattern may reduce the possibility of non-MyPAN devices being able to determine and/or synchronize to the virtual master clock.

In some demonstrative embodiments, the drift pattern may include a pseudo-random drift pattern.

In some demonstrative embodiments, the pseudo-random drift pattern may be defined, for example, upon setting up MyPAN 109, e.g., by controller 122.

In some demonstrative embodiments, the pseudo-random drift pattern may be defined, for example, based on the master clock seed.

In some demonstrative embodiments, the pseudo-random drift pattern may be defined, for example, based on the MySecret information.

In some demonstrative embodiments, the pseudo-random drift pattern may be communicated between the MyPAN devices of MyPAN 109. For example, the master clock information may include the pseudo-random drift pattern corresponding to the virtual master clock.

In some demonstrative embodiments, a MyPAN device may be configured to determine (calibrate) the virtual master clock based on the pseudo-random drift pattern.

In some demonstrative embodiments, controllers 122 and/or 152 may calibrate the virtual master clock according to the pseudo-random drift pattern.

In some demonstrative embodiments, a MyPAN device of MyPAN 109, e.g., device 102, may transmit a message including an indication of a current drift according to the drift pattern, and another MyPAN device, e.g., device 104, may receive the message, and determine (calibrate) the virtual master clock based on the current drift.

In one example, controller 122 may determine the current drift of the virtual master clock, message processor 128 may generate a message including an indication of the current drift, and transmitter 118 may transmit the message. According to this example, receiver 146 of device 104 may receive the message, message processor 154 may access the message including the indication of the current drift, and controller 152 may determine the virtual master clock based on the current drift.

In some demonstrative embodiments, device 102 may transmit Sync frames, e.g., beacons, according to the superframe timing synchronized to the virtual master clock, e.g., as described above. For example, radio 114 may transmit the Sync frames over a WiFi connection, a Bluetooth connection, and the like.

In some demonstrative embodiments, device 104 may operate at a scan mode, e.g., upon waking up from a reduced power mode, to detect a sync frame (beacon) in a window around a beacon period ("saved beacon period"), which may be maintained by controller 152 based on the virtual master clock seed and/or the virtual master clock drift pattern, e.g., as described above.

In some demonstrative embodiments, controller 152 may determine the drift of clock 156 with respect to the virtual master clock based on the time stamp of the sync frames, e.g., as described below.

In some demonstrative embodiments, controller 152 may be configured to dynamically determine the virtual master clock using clock 156 based on the time drift of clock 156, e.g., as described below.

In some demonstrative embodiments, controller 152 may be configured to continuously calibrate the time drift of clock 156, for example, until reception of another sync frame by radio 144. For example, controller 152 may update the time drift based on a time stamp of the other sync frame.

In some demonstrative embodiments, controller 152 may be configured to continuously calibrate the time drift of clock 156, for example, as long as device 104 belongs to MyPAN 109, e.g., even when device 104 is disconnected form MyPAN 109, when device 104 and/or radio 144 is operating in a sleep mode, and/or when radio 144 is powered off.

In some demonstrative embodiments, the continuous calibration of clock 156 may enable controller 152 to maintain synchronization to the virtual master clock.

In some demonstrative embodiments, controller 152 may determine the drift of clock 156 relative to the virtual master clock, for example, based on the time stamp and a counter of clock 156. For example, the drift, denoted 6, of clock 156 from the virtual master clock, may be determined based on a received time stamp of the virtual master clock, denoted Tv, and a time stamp, denoted Tl, of clock 156, e.g., as follows:

$$\sigma = Tl - Tv \qquad (1)$$

In some demonstrative embodiments, controller 152 may dynamically calibrate the drift of clock 156, for example, by determining an updated drift, denoted Su, based on a current drift, denoted Sc, and a moving average of the drift σ, e.g., within a moving window of a predefined number, denoted n, sync frames including time stamps, e.g., as follows:

$$Su = Sc + \frac{1}{n}\sum_n \sigma \qquad (2)$$

In other embodiments, controller 152 may dynamically calibrate the drift of clock 156 based on any other algorithm and/or calculation.

In some demonstrative embodiments, the virtual master clock may be utilized by the MyPAN devices to synchronize between elements of the MyPAN devices, e.g., as described below.

In some demonstrative embodiments, devices 102, 104 and/or 105 may include one or more sensors. For example, device 102 may include a sensor 129, and/or device 104 may include a sensor 150. Sensors 129 and/or 150 may include, for example, acoustic sensors, visual sensors and/or any other sensors.

In some demonstrative embodiments, devices 102 and 104 may be able to synchronize between sensors 129 and 150 based on the virtual master clock, e.g., to synchronize a sampling rate of sensors 129 and 150.

In some demonstrative embodiments, controller 152 may receive a wake up request, for example, from an application requesting data from sensor 150. Controller 152 may determine an upcoming super-frame slot of an upcoming sync frame, e.g., based on the virtual master clock. Controller 152 may operate radio 144 at a scan mode during the super-frame time slot to detect the sync frame.

In some demonstrative embodiments, controller 152 may determine one or more TX/X slots based on the sync frame, and may communicate with device data during the TX/RX time slots.

In some demonstrative embodiments, a sampling rate of sensor 150 may be based on clock 156. Controller 152 may synchronize a sampling rate of sensor 150 to a sampling rate of sensor 129, for example, by calibrating the drift of clock 156 based on time stamps of received sync frames, for example, according to Equation 2.

In some demonstrative embodiments, a device may be configured to belong to a plurality of MyPAN networks, for example, to maintain virtual synchronization to multiple MySync virtual clocks, and/or to exchange secured information using a plurality MyEncryption private keys.

In some demonstrative embodiments, controller 122 may be able to count at least first and second different virtual master clocks corresponding to at least first and second respective groups of wireless communication devices. For example, device 102 may belong to a first MyPAN, e.g., MyPAN 109 including devices 104 and/or 105, and device 102 may belong to a second MyPAN (not shown), which may include one or more of devices 104 and 105 and/or one or more other devices.

In some demonstrative embodiments, controller 122 may control radio 114 to communicate with devices of the first the first group of wireless communication devices according to the first virtual master clock, and to communicate with the second group of wireless communication devices according the second virtual master clock.

In some demonstrative embodiments, controller 122 may be configured to define the virtual master clock, for example, upon setting up and/or initializing MyPAN 109, as described below.

In some demonstrative embodiments, a MyPAN user, e.g., a user of device 102, may decide to create MyPAN network 109.

In some demonstrative embodiments, the MyPAN user may select a MyPAN MySync master (the "first MySync master"), e.g., device 102, for example, by using input 192 to provide input to a user interface of a MyPAN application.

In some demonstrative embodiments, controller 122 may receive from the MyPAN user a MyPAN secret, e.g., a password, biometric information, and the like. Controller 122 may store the MyPAN secret, e.g., in a secure manner.

In some demonstrative embodiments, controller 122 may calculate a virtual master clock corresponding to the MyPAN using a clock rate ("perfect timer") drift pattern, which may be based on a permutation of the MyPAN secret.

In one example, the perfect timer clock rate may be 10 Mega Hertz (MHz), and an initial drift may be 101.3527 parts per million (ppm). According to this example, the initial drift may be 1013.527 Hertz (Hz), and the virtual master clock may be set to 10.103527 MHz.

In some demonstrative embodiments, controller 122 may count super-frames based "perfect timer" clocks, for example, 64 milliseconds (ms), or 640000 "perfect timer" clocks.

In some demonstrative embodiments, controller 122 may determine an accumulated drift of the virtual master clock corresponding to a super-frame. For example, an accumulated drift for 101.3527 ppm at 10 Mhz during 64 ms may be +64.865728 counts.

In some demonstrative embodiments, controller 122 may determine a drift to synchronize clock 126 to the virtual master clock.

In some demonstrative embodiments, controller 122 may generate a local timer, which counts "perfect timer+drift" tics, e.g., using local clock 126.

In one example, clock 126 may be a 38 MHz clock, with a drift of +25 ppm, i.e., 38.095 MHz. Controller 122 may treat local clock 126 as "perfect", e.g., since controller 122 may not be able to determine the clock drift of clock 126 from the perfect clock of 38 Mhz. According to this example, a generated drift of clock 126 during 64 ms may be +246.4897664 system clock tics of clock 126. According to this example, an actual drift for 64 ms, considering the own drift of clock 126, may be +60.8 counts. Accordingly, a total drift of the virtual clock generated by controller 122 from a "perfect timer" of the virtual master clock may be +307.2897664 counts from "perfect" system clocks (126.3527 ppm).

In some demonstrative embodiments, controller 122 may generate a wireless interface synchronization clock, e.g., a Bluetooth clock, a WiFi clock and the like, as "derivatives" of the "perfect timer" virtual master clock. For example, a TSF timer of the 802.11 standards may be based on a 1-MHz clock and may "tick" in microseconds. A Bluetooth native clock may have a resolution of half a slot, e.g., 312.5 microseconds (uS)/3.2 Khz.

In some demonstrative embodiments, controller 122 may provide the MyPAN secret to another MyPAN device, e.g., device 104, for example, upon pairing with the device, for example, via secured messaging. Alternatively, the MyPAN user may provide the MyPAN secret directly to the other device.

In some demonstrative embodiments, controller 122 may send to the other MyPAN device the current drift of the MySync virtual master clock within the "perfect timer" counting (fixed/pseudo random series). For example, controller 122 may send the current drift to the other MyPAN device via a periodic sync frame, or via a secure message, e.g., a message which is incorporated within a 4-way messaging scheme.

In some demonstrative embodiments, controller 152 may calculate a future virtual master clock drift pattern, for example, based on the MyPAN secret and the current drift. For example, the future drift may be determined based on a permutation of the MyPAN secret seed accumulated with the clock drift from the "perfect timer".

In some demonstrative embodiments, the drift from "perfect timer" of device 102 may be "carried-on" by device 104, for example, even when device 102 is no longer acting as the MyPAN master, or even when device 102 is no longer active within MyPAN network 109, e.g., as described above.

In some demonstrative embodiments, device 104 may be assigned to take over the role of the MyPAN master. According to these embodiments, controller 152 may determine the current drift of the MySync master clock (fixed/ pseudo random series) based on an internal alignment of clock 156 to the clock of device 102.

Figure 2:
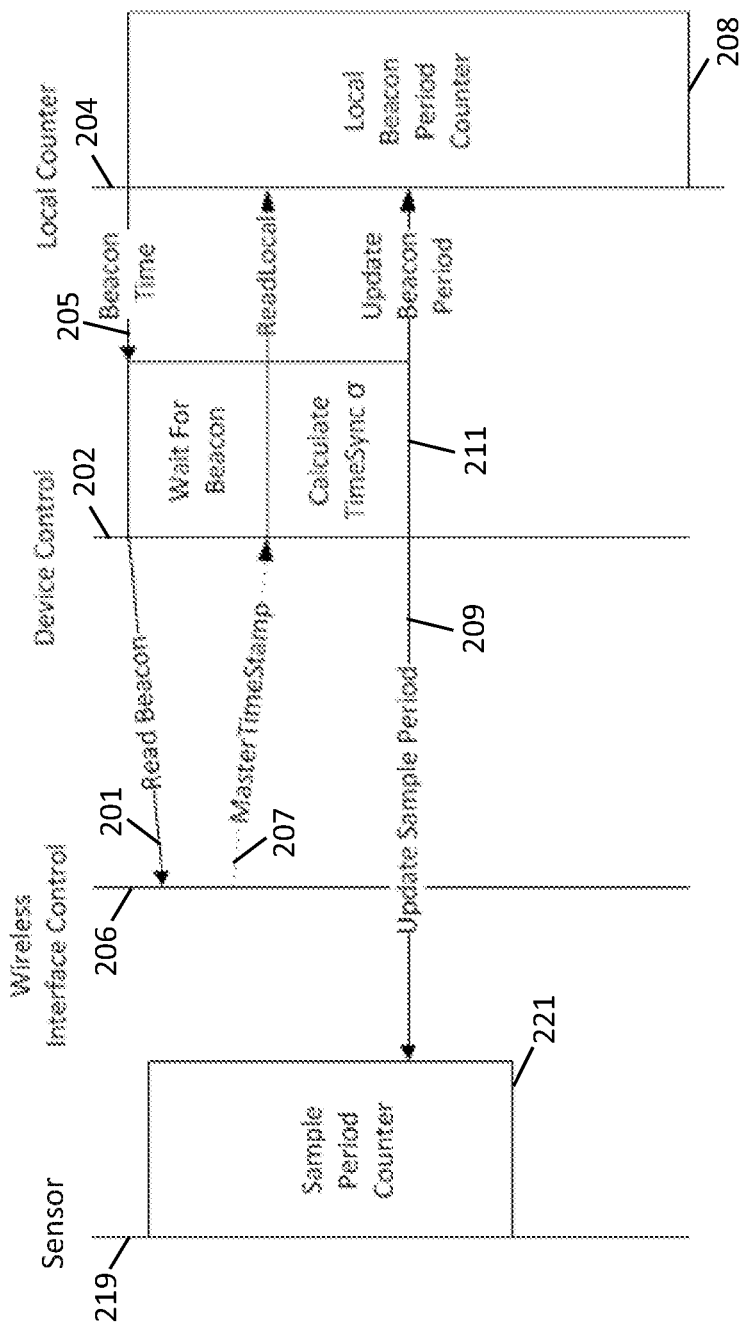
FIG. 2 is a schematic illustration of a sequence diagram of operations performed by a controller to synchronize a beacon time to a virtual master clock based on a synchronization frame, in accordance with some demonstrative embodiments.

Reference is made to FIG. 2, which schematically illustrates a sequence diagram of operations performed by a controller 202 to synchronize a beacon time to a virtual master clock based on a synchronization frame, in accordance with some demonstrative embodiments. For example, controller 202 may perform the functionality of controller 152 (FIG. 1).

In some demonstrative embodiments, a local clock 204, e.g., clock 156 (FIG. 1), may keep track of a local beacon period according to a beacon period counter 208. Controller 202 may trigger a radio 206, e.g., radio 144 (FIG. 1), to scan for a beacon (201), e.g., based on a beacon time 205 from local clock 204. Controller 202 may read a master time stamp 207 from the received beacon. Controller 202 may update (211) beacon period counter 208 based on master time stamp 207, e.g., to synchronize the beacon period to the master time tamp 207.

In some demonstrative embodiments, controller 202 may also update (209) a sample counter 221 of a sensor 219. For example, sensor 219 may perform the functionality of sensor 150 (FIG. 1). In one example, controller 202 may update sample counter 221, for example, to synchronize a sampling clock of sensor 219 to the virtual master clock, e.g., as described above.

Figure 3:
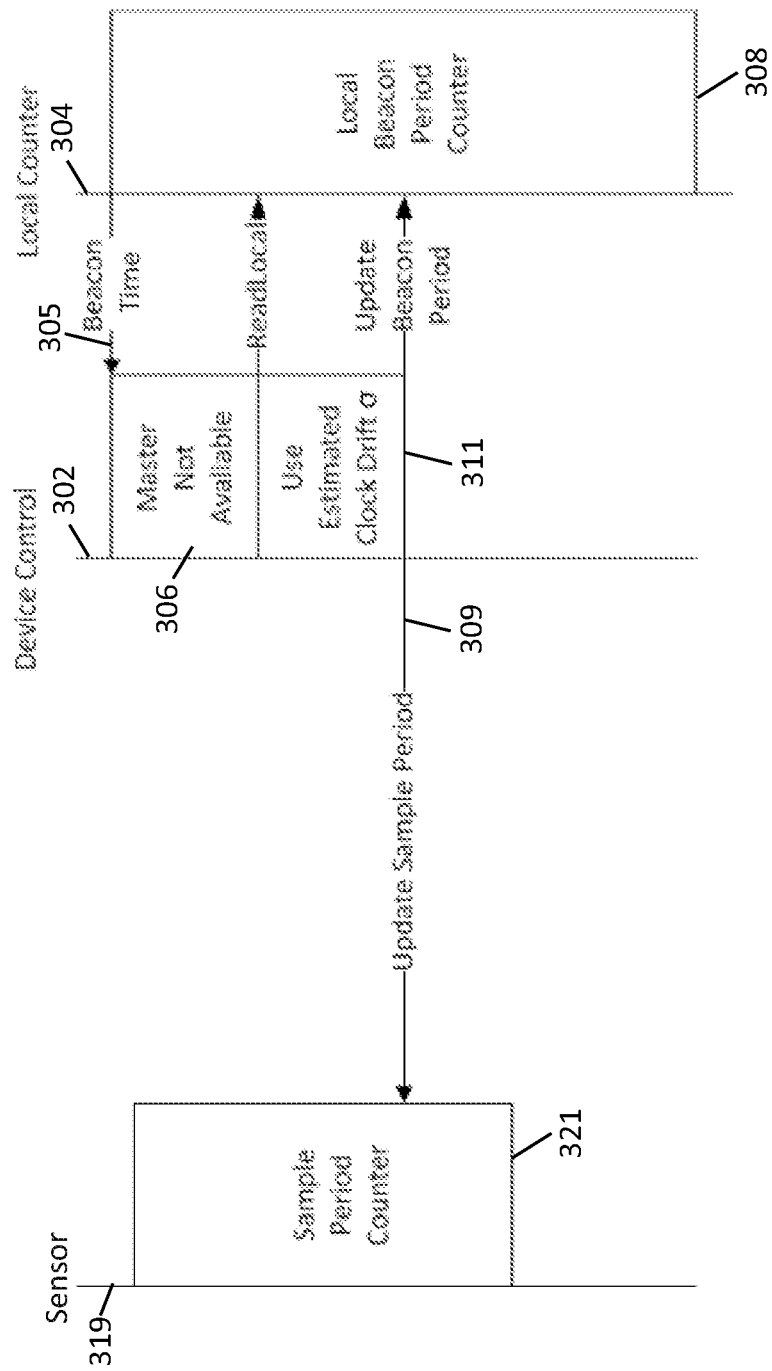
FIG. 3 is a schematic illustration of a sequence diagram of operations performed by a controller to synchronize a beacon time to a virtual master clock between synchronization frames, in accordance with some demonstrative embodiments.

Reference is made to FIG. 3, which schematically illustrates a sequence diagram of operations performed by a controller 302 to synchronize a beacon time to a virtual master clock between synchronization frames, in accordance with some demonstrative embodiments. For example, controller 302 may perform the functionality of controller 202 (FIG. 2).

In some demonstrative embodiments, a local clock 304 may keep track of a local beacon period according to a beacon period counter 308. Controller 302 may attempt to trigger a radio, e.g., radio 144 (FIG. 1), to scan for a beacon, e.g., based on a beacon time 305 from local clock 304. As shown in FIG. 3, an updated master time stamp may not be available (306), for example, if the radio is powered off and/or in a sleep mode, if a wireless network connection is not available, and/or if a beacon is not receive for any other reason.

In some demonstrative embodiments, controller 302 may update (311) a beacon period counter 308, for example, based on a time drift estimated with respect to previously received master time stamps, for example, according to Equation 2, e.g., as long as a new time stamp is not received.

In some demonstrative embodiments, controller 302 may also update (309) a sample counter 321 of a sensor 319. For example, sensor 319 may perform the functionality of sensor 150 (FIG. 1). In one example, controller 302 may update sample counter 321, for example, to synchronize a sampling clock of sensor 319 to the virtual master clock, e.g., as described above.

Figure 4:
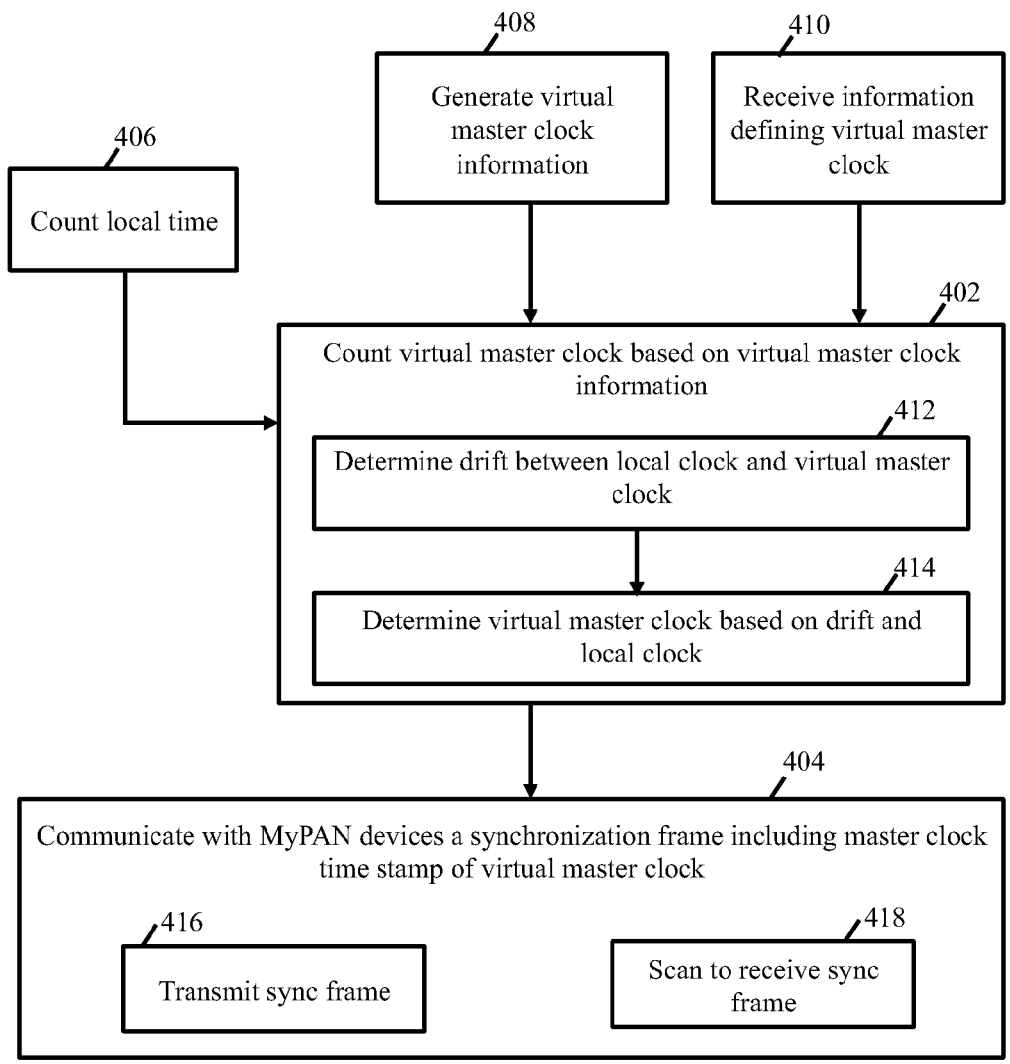
FIG. 4 is a flow-chart illustration of a method of synchronizing between wireless communication devices, in accordance with some demonstrative embodiments.

FIG. 4 is a flow-chart illustration of a method of synchronizing between wireless communication devices, in accordance with some demonstrative embodiments. On or more operations of the method of FIG. 4 may be performed, for example, by one or more elements of a system, e.g., system 100 (FIG. 1), a device, e.g., device 102 (FIG. 1) and/or device 104 (FIG. 1), and/or a controller, e.g., controller 122 (FIG. 1) and/or controller 152 (FIG. 1).

As indicated at block 406, the method may include counting a local time. For example, local clock 126 (FIG. 1) may count a local time at device 102 (FIG. 1), e.g., as described above.

As indicated at block 402, the method may include counting a virtual master clock corresponding to a group of wireless communication devices according to master clock information defining the virtual master clock. For example, controller 122 (FIG. 1) may count the virtual master clock based on master clock information corresponding to MyPAN 109 (FIG. 1), e.g., as described above.

As indicated at block 408, in some demonstrative embodiments the method may include generating the master clock information. For example, controller 122 (FIG. 1) may generate the master clock information, for example, based on the MySeed information, e.g., as described above.

As indicated at block 410, in some demonstrative embodiments the method may include receiving the master clock information, e.g., from another device. For example, device 104 (FIG. 1) may receive the master clock information, e.g., from device 102 (FIG. 1), as described above.

As indicated at block 412, the method may include determining a time drift between the local clock and the virtual master clock. For example, controller 122 (FIG. 1) may determine the time drift between clock 126 (FIG. 1) and the virtual master clock, e.g., as described above.

As indicated at block 414, the method may include determining the virtual master clock based on the local time and the time drift. For example, controller 122 (FIG. 1) may determine the virtual master clock based on the drift and the time counted by clock 126 (FIG. 1), e.g., as described above.

As indicated at block 404, the method may include communicating with one or more devices of the group of wireless communication devices a synchronization frame including a master clock time stamp of the virtual master clock. For example, device 102 (FIG. 1) may communicate with devices 104 and/or 105 (FIG. 1) one or more beacons including the master time stamp of the virtual master clock, e.g., as described above.

As indicated at block 416, communicating the synchronization frame may include transmitting the synchronization frame. For example, device 102 (FIG. 1) may transmit the synchronization frame, e.g., when device 102 (FIG. 1) performs the functionality of a master device.

As indicated at block 416, communicating the synchronization frame may include scanning to receive the synchronization frame. For example, controller 152 may control device 104 (FIG. 1) to scan for the synchronization frame, e.g., when device 104 (FIG. 1) performs the functionality of a client device.

Figure 5:
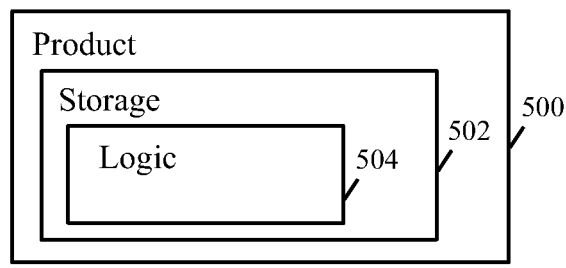
FIG. 5 is a schematic illustration of a product of manufacture, in accordance with some demonstrative embodiments.

Reference is made to FIG. 5, which schematically illustrates a product of manufacture, in accordance with some demonstrative embodiments. Product 500 may include a non-transitory machine-readable storage medium 502 to store logic 504, which may be used, for example, to perform at least part of the functionality of device 102 (FIG. 1), device 104 (FIG. 1), message processor 128 (FIG. 1), message processor 154 (FIG. 1), controller 152 (FIG. 1), controller 122 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wireless communication device comprising a clock to count a local time; a controller to count a virtual master clock corresponding to a group of wireless communication devices according to master clock information defining the virtual master clock, the controller to determine a time drift between the local clock and the virtual master clock, and to determine the virtual master clock based on the local time and the time drift; and a radio to communicate with one or more devices of the group of wireless communication devices a synchronization frame including a master clock time stamp of the virtual master clock.

Example 2 includes the subject matter of Example 1, and optionally, wherein the controller is to receive the master clock information upon joining the group of wireless communication devices.

Example 3 includes the subject matter of Example 1, and optionally, wherein the controller is to generate the master clock information.

Example 4 includes the subject matter of any one of Examples 1-3, and optionally, wherein the master clock information comprises a pseudo-random drift pattern corresponding to the virtual master clock, the controller is to calibrate the virtual master clock according to the pseudo-random drift pattern.

Example 5 includes the subject matter of Example 4, and optionally, wherein the radio is to receive a message including drift information indicating a current drift according to the drift pattern, the controller to calibrate the virtual master clock based on the current drift.

Example 6 includes the subject matter of any one of Examples 1-5, and optionally, wherein the master clock information comprises a master clock seed, which is based on biometric information of a user of at least one device of the group of wireless communication devices.

Example 7 includes the subject matter of any one of Examples 1-6, and optionally, wherein the radio is to receive a first synchronization frame including a first time stamp of the virtual master clock, when the wireless communication device is a client of the group of wireless communication devices, and wherein the radio is to transmit a second synchronization frame including a second time stamp of the virtual master clock, when the wireless communication device is a master of the group of wireless communication devices.

Example 8 includes the subject matter of any one of Examples 1-7, and optionally, wherein the controller is to determine the time drift based on one or more time stamps of one or more synchronization frames received from the group of wireless communication devices.

Example 9 includes the subject matter of any one of Examples 1-8, and optionally, wherein the controller is to calibrate the virtual master clock based on the time drift, subsequent to disconnection from the group of wireless communication, and to reconnect to the group of wireless communication using the virtual master clock.

Example 10 includes the subject matter of any one of Examples 1-9, and optionally, wherein the controller is to calibrate the virtual master clock based on the time drift, subsequent to power-down or power-off of the wireless communication device.

Example 11 includes the subject matter of any one of Examples 1-10, and optionally, wherein the controller is to count at least first and second different virtual master clocks corresponding to at least first and second respective groups of wireless communication devices, the radio to communicate with the first group of wireless communication devices according to the first virtual master clock, and to communicate with the second group of wireless communication devices according to the second virtual master clock.

Example 12 includes the subject matter of any one of Examples 1-11, and optionally, wherein the virtual master clock comprises a virtual master Time Synchronization Function (TSF).

Example 13 includes the subject matter of any one of Examples 1-12, and optionally, wherein the controller is to determine the virtual master clock based on a secret key corresponding to the group of wireless communication devices.

Example 14 includes the subject matter of any one of Examples 1-13, and optionally, wherein the group of wireless communication devices comprises a My Personal Area Network (MyPAN).

Example 15 includes the subject matter of any one of Examples 1-14 including one or more antennas, a memory and a processor.

Example 16 includes a wireless communication system comprising a mobile device, the mobile device including one or more antennas; a memory; a processor; a clock to count a local time; a controller to count a virtual master clock corresponding to a group of wireless communication devices according to master clock information defining the virtual master clock, the controller to determine a time drift between the local clock and the virtual master clock, and to determine the virtual master clock based on the local time and the time drift; and a radio to communicate with one or more devices of the group of wireless communication devices a synchronization frame including a master clock time stamp of the virtual master clock.

Example 17 includes the subject matter of Example 16, and optionally, wherein the controller is to receive the master clock information upon joining the group of wireless communication devices.

Example 18 includes the subject matter of Example 16, and optionally, wherein the controller is to generate the master clock information.

Example 19 includes the subject matter of any one of Examples 16-18, and optionally, wherein the master clock information comprises a pseudo-random drift pattern corresponding to the virtual master clock, the controller is to calibrate the virtual master clock according to the pseudo-random drift pattern.

Example 20 includes the subject matter of Example 19, and optionally, wherein the radio is to receive a message including drift information indicating a current drift according to the drift pattern, the controller to calibrate the virtual master clock based on the current drift.

Example 21 includes the subject matter of any one of Examples 16-20, and optionally, wherein the master clock information comprises a master clock seed, which is based on biometric information of a user of at least one device of the group of wireless communication devices.

Example 22 includes the subject matter of any one of Examples 16-21, and optionally, wherein the radio is to receive a first synchronization frame including a first time stamp of the virtual master clock, when the wireless communication device is a client of the group of wireless communication devices, and wherein the radio is to transmit a second synchronization frame including a second time stamp of the virtual master clock, when the wireless communication device is a master of the group of wireless communication devices.

Example 23 includes the subject matter of any one of Examples 16-22, and optionally, wherein the controller is to determine the time drift based on one or more time stamps of one or more synchronization frames received from the group of wireless communication devices.

Example 24 includes the subject matter of any one of Examples 16-23, and optionally, wherein the controller is to calibrate the virtual master clock based on the time drift, subsequent to disconnection from the group of wireless communication, and to reconnect to the group of wireless communication using the virtual master clock.

Example 25 includes the subject matter of any one of Examples 16-24, and optionally, wherein the controller is to calibrate the virtual master clock based on the time drift, subsequent to power-down or power-off of the wireless communication device.

Example 26 includes the subject matter of any one of Examples 16-25, and optionally, wherein the controller is to count at least first and second different virtual master clocks corresponding to at least first and second respective groups of wireless communication devices, the radio to communicate with the first group of wireless communication devices according to the first virtual master clock, and to communicate with the second group of wireless communication devices according to the second virtual master clock.

Example 27 includes the subject matter of any one of Examples 16-26, and optionally, wherein the virtual master clock comprises a virtual master Time Synchronization Function (TSF).

Example 28 includes the subject matter of any one of Examples 16-27, and optionally, wherein the controller is to determine the virtual master clock based on a secret key corresponding to the group of wireless communication devices.

Example 29 includes the subject matter of any one of Examples 16-28, and optionally, wherein the group of wireless communication devices comprises a My Personal Area Network (MyPAN).

Example 30 includes a method to be performed by a wireless communication device, the method comprising counting a local time; counting a virtual master clock corresponding to a group of wireless communication devices according to master clock information defining the virtual master clock, the counting including determining a time drift between the local clock and the virtual master clock, and determining the virtual master clock based on the local time and the time drift; and communicating with one or more devices of the group of wireless communication devices a synchronization frame including a master clock time stamp of the virtual master clock.

Example 31 includes the subject matter of Example 30, and optionally, comprising receiving the master clock information upon joining the group of wireless communication devices.

Example 32 includes the subject matter of Example 30, and optionally, comprising generating the master clock information.

Example 33 includes the subject matter of any one of Examples 30-32, and optionally, wherein the master clock information comprises a pseudo-random drift pattern corresponding to the virtual master clock, the method comprising calibrating the virtual master clock according to the pseudo-random drift pattern.

Example 34 includes the subject matter of Example 35, and optionally, comprising receiving a message including drift information indicating a current drift according to the drift pattern, and to calibrating the virtual master clock based on the current drift.

Example 35 includes the subject matter of any one of Examples 30-34, and optionally, wherein the master clock information comprises a master clock seed, which is based on biometric information of a user of at least one device of the group of wireless communication devices.

Example 36 includes the subject matter of any one of Examples 30-35, and optionally, comprising receiving a first synchronization frame including a first time stamp of the virtual master clock, when the wireless communication device is a client of the group of wireless communication devices, and transmitting a second synchronization frame including a second time stamp of the virtual master clock, when the wireless communication device is a master of the group of wireless communication devices.

Example 37 includes the subject matter of any one of Examples 30-36, and optionally, comprising determining the time drift based on one or more time stamps of one or more synchronization frames received from the group of wireless communication devices.

Example 38 includes the subject matter of any one of Examples 30-37, and optionally, comprising calibrating the virtual master clock based on the time drift, subsequent to disconnection from the group of wireless communication, and reconnecting to the group of wireless communication using the virtual master clock.

Example 39 includes the subject matter of any one of Examples 30-38, and optionally, comprising calibrating the virtual master clock based on the time drift, subsequent to power-down or power-off of the wireless communication device.

Example 40 includes the subject matter of any one of Examples 30-39, and optionally, comprising counting at least first and second different virtual master clocks corresponding to at least first and second respective groups of wireless communication devices, communicating with the first group of wireless communication devices according to the first virtual master clock, and communicating with the second group of wireless communication devices according to the second virtual master clock.

Example 41 includes the subject matter of any one of Examples 30-40, and optionally, wherein the virtual master clock comprises a virtual master Time Synchronization Function (TSF).

Example 42 includes the subject matter of any one of Examples 30-41, and optionally, comprising determining the virtual master clock based on a secret key corresponding to the group of wireless communication devices.

Example 43 includes the subject matter of any one of Examples 30-42, and optionally, wherein the group of wireless communication devices comprises a My Personal Area Network (MyPAN).

Example 44 includes a product including one or more tangible computer-readable non-transitory storage media comprising computer-executable instructions operable to, when executed by at least one computer processor, enable the at least one computer processor to implement a method at a wireless communication device, the method comprising counting a local time; counting a virtual master clock corresponding to a group of wireless communication devices according to master clock information defining the virtual master clock, the counting including determining a time drift between the local clock and the virtual master clock, and determining the virtual master clock based on the local time and the time drift; and communicating with one or more devices of the group of wireless communication devices a synchronization frame including a master clock time stamp of the virtual master clock.

Example 45 includes the subject matter of Example 44, and optionally, wherein the method comprises receiving the master clock information upon joining the group of wireless communication devices.

Example 46 includes the subject matter of Example 44, and optionally, wherein the method comprises generating the master clock information.

Example 47 includes the subject matter of any one of Examples 44-46, and optionally, wherein the master clock information comprises a pseudo-random drift pattern corresponding to the virtual master clock, the method comprising calibrating the virtual master clock according to the pseudo-random drift pattern.

Example 48 includes the subject matter of Example 47, and optionally, wherein the method comprises receiving a message including drift information indicating a current drift according to the drift pattern, and to calibrating the virtual master clock based on the current drift.

Example 49 includes the subject matter of any one of Examples 44-48, and optionally, wherein the master clock information comprises a master clock seed, which is based on biometric information of a user of at least one device of the group of wireless communication devices.

Example 50 includes the subject matter of any one of Examples 44-49, and optionally, wherein the method comprises receiving a first synchronization frame including a first time stamp of the virtual master clock, when the wireless communication device is a client of the group of wireless communication devices, and transmitting a second synchronization frame including a second time stamp of the virtual master clock, when the wireless communication device is a master of the group of wireless communication devices.

Example 51 includes the subject matter of any one of Examples 44-50, and optionally, wherein the method comprises determining the time drift based on one or more time stamps of one or more synchronization frames received from the group of wireless communication devices.

Example 52 includes the subject matter of any one of Examples 44-51, and optionally, wherein the method comprises calibrating the virtual master clock based on the time drift, subsequent to disconnection from the group of wireless communication, and reconnecting to the group of wireless communication using the virtual master clock.

Example 53 includes the subject matter of any one of Examples 44-52, and optionally, wherein the method comprises calibrating the virtual master clock based on the time drift, subsequent to power-down or power-off of the wireless communication device.

Example 54 includes the subject matter of any one of Examples 44-53, and optionally, wherein the method comprises counting at least first and second different virtual master clocks corresponding to at least first and second respective groups of wireless communication devices, communicating with the first group of wireless communication devices according to the first virtual master clock, and communicating with the second group of wireless communication devices according to the second virtual master clock.

Example 55 includes the subject matter of any one of Examples 44-54, and optionally, wherein the virtual master clock comprises a virtual master Time Synchronization Function (TSF).

Example 56 includes the subject matter of any one of Examples 44-55, and optionally, wherein the method comprises determining the virtual master clock based on a secret key corresponding to the group of wireless communication devices.

Example 57 includes the subject matter of any one of Examples 44-56, and optionally, wherein the group of wireless communication devices comprises a My Personal Area Network (MyPAN).

Example 58 includes an apparatus of wireless communication, the apparatus comprising means for counting a local time; means for counting a virtual master clock corresponding to a group of wireless communication devices according to master clock information defining the virtual master clock, the counting including determining a time drift between the local clock and the virtual master clock, and determining the virtual master clock based on the local time and the time drift; and means for communicating with one or more devices of the group of wireless communication devices a synchronization frame including a master clock time stamp of the virtual master clock.

Example 59 includes the subject matter of Example 58, and optionally, comprising means for receiving the master clock information upon joining the group of wireless communication devices.

Example 60 includes the subject matter of Example 58, and optionally, comprising means for generating the master clock information.

Example 61 includes the subject matter of any one of Examples 58-60, and optionally, wherein the master clock information comprises a pseudo-random drift pattern corresponding to the virtual master clock, the apparatus comprising means for calibrating the virtual master clock according to the pseudo-random drift pattern.

Example 62 includes the subject matter of Example 61, and optionally, comprising means for receiving a message including drift information indicating a current drift according to the drift pattern, and to calibrating the virtual master clock based on the current drift.

Example 63 includes the subject matter of any one of Examples 58-62, and optionally, wherein the master clock information comprises a master clock seed, which is based on biometric information of a user of at least one device of the group of wireless communication devices.

Example 64 includes the subject matter of any one of Examples 58-63, and optionally, comprising means for receiving a first synchronization frame including a first time stamp of the virtual master clock, when the wireless communication device is a client of the group of wireless communication devices, and transmitting a second synchronization frame including a second time stamp of the virtual master clock, when the wireless communication device is a master of the group of wireless communication devices.

Example 65 includes the subject matter of any one of Examples 58-64, and optionally, comprising means for determining the time drift based on one or more time stamps of one or more synchronization frames received from the group of wireless communication devices.

Example 66 includes the subject matter of any one of Examples 58-65, and optionally, comprising means for calibrating the virtual master clock based on the time drift, subsequent to disconnection from the group of wireless communication, and reconnecting to the group of wireless communication using the virtual master clock.

Example 67 includes the subject matter of any one of Examples 58-66, and optionally, comprising means for calibrating the virtual master clock based on the time drift, subsequent to power-down or power-off of the wireless communication device.

Example 68 includes the subject matter of any one of Examples 58-67, and optionally, comprising means for counting at least first and second different virtual master clocks corresponding to at least first and second respective groups of wireless communication devices, communicating with the first group of wireless communication devices according to the first virtual master clock, and communicating with the second group of wireless communication devices according to the second virtual master clock.

Example 69 includes the subject matter of any one of Examples 58-68, and optionally, wherein the virtual master clock comprises a virtual master Time Synchronization Function (TSF).

Example 70 includes the subject matter of any one of Examples 58-69, and optionally, comprising means for determining the virtual master clock based on a secret key corresponding to the group of wireless communication devices.

Example 71 includes the subject matter of any one of Examples 58-70, and optionally, wherein the group of wireless communication devices comprises a My Personal Area Network (MyPAN).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A wireless communication device comprising:
a clock to count a local time;
a controller to count a virtual master clock corresponding to a group of wireless communication devices according to master clock information defining said virtual master clock, the controller to determine a time drift between said local clock and said virtual master clock, and to determine said virtual master clock based on said local time and the time drift; and
a radio to communicate with one or more devices of the group of wireless communication devices a synchronization frame including a master clock time stamp of said virtual master clock.

2. The wireless communication device of claim 1, wherein said controller is to receive said master clock information upon joining said group of wireless communication devices.

3. The wireless communication device of claim 1, wherein said controller is to generate said master clock information.

4. The wireless communication device of claim 1, wherein said master clock information comprises a pseudo-random drift pattern corresponding to said virtual master clock, said controller is to calibrate said virtual master clock according to said pseudo-random drift pattern.

5. The wireless communication device of claim 4, wherein said radio is to receive a message including drift information indicating a current drift according to said drift pattern, said controller to calibrate said virtual master clock based on said current drift.

6. The wireless communication device of claim 1, wherein said master clock information comprises a master clock seed, which is based on biometric information of a user of at least one device of said group of wireless communication devices.

7. The wireless communication device of claim 1, wherein said radio is to receive a first synchronization frame including a first time stamp of said virtual master clock, when said wireless communication device is a client of said group of wireless communication devices, and wherein said radio is to transmit a second synchronization frame including a second time stamp of said virtual master clock, when said wireless communication device is a master of said group of wireless communication devices.

8. The wireless communication device of claim 1, wherein said controller is to determine said time drift based on one or more time stamps of one or more synchronization frames received from said group of wireless communication devices.

9. The wireless communication device of claim 1, wherein said controller is to calibrate said virtual master clock based on said time drift, subsequent to disconnection from said group of wireless communication devices, and to reconnect to said group of wireless communication devices using the virtual master clock.

10. The wireless communication device of claim 1, wherein said controller is to calibrate said virtual master clock based on said time drift, subsequent to power-down or power-off of said wireless communication device.

11. The wireless communication device of claim 1, wherein said controller is to count at least first and second different virtual master clocks corresponding to at least first and second respective groups of wireless communication devices, said radio to communicate with said first group of wireless communication devices according to said first virtual master clock, and to communicate with said second group of wireless communication devices according to said second virtual master clock.

12. The wireless communication device of claim 1, wherein said virtual master clock comprises a virtual master Time Synchronization Function (TSF).

13. The wireless communication device of claim 1, wherein said controller is to determine said virtual master clock based on a secret key corresponding to said group of wireless communication devices.

14. The wireless communication device of claim 1, wherein said group of wireless communication devices comprises a My Personal Area Network (MyPAN).

15. A wireless communication system comprising a mobile device, the mobile device including:
one or more antennas;
a memory;
a processor;
a clock to count a local time;
a controller to count a virtual master clock corresponding to a group of wireless communication devices according to master clock information defining said virtual master clock, the controller to determine a time drift between said local clock and said virtual master clock, and to determine said virtual master clock based on said local time and the time drift; and
a radio to communicate with one or more devices of the group of wireless communication devices a synchronization frame including a master clock time stamp of said virtual master clock.

16. The wireless communication system of claim 15, wherein said master clock information comprises a pseudo-random drift pattern corresponding to said virtual master clock, said controller is to calibrate said virtual master clock according to said pseudo-random drift pattern.

17. The wireless communication system of claim 15, wherein said master clock information comprises a master clock seed, which is based on biometric information of a user of at least one device of said group of wireless communication devices.

18. A method to be performed by a wireless communication device, the method comprising:
counting a local time;
counting a virtual master clock corresponding to a group of wireless communication devices according to master clock information defining said virtual master clock, the counting including determining a time drift between said local clock and said virtual master clock, and determining said virtual master clock based on said local time and the time drift; and
communicating with one or more devices of the group of wireless communication devices a synchronization frame including a master clock time stamp of said virtual master clock.

19. The method of claim 18 comprising receiving said master clock information upon joining said group of wireless communication devices.

20. The method of claim 18, wherein said master clock information comprises a pseudo-random drift pattern corresponding to said virtual master clock, the method comprising calibrating said virtual master clock according to said pseudo-random drift pattern.

21. A product including one or more tangible computer-readable non-transitory storage media comprising computer-executable instructions operable to, when executed by at least one computer processor, enable the at least one computer processor to implement operations at a wireless communication device, the operations comprising:
   counting a local time;
   counting a virtual master clock corresponding to a group of wireless communication devices according to master clock information defining said virtual master clock, the counting including determining a time drift between said local clock and said virtual master clock, and determining said virtual master clock based on said local time and the time drift; and
   communicating with one or more devices of the group of wireless communication devices a synchronization frame including a master clock time stamp of said virtual master clock.

22. The product of claim 21, wherein said master clock information comprises a pseudo-random drift pattern corresponding to said virtual master clock, the operations comprising calibrating said virtual master clock according to said pseudo-random drift pattern.

23. The product of claim 21, wherein said master clock information comprises a master clock seed, which is based on biometric information of a user of at least one device of said group of wireless communication devices.

24. The product of claim 21, wherein the operations comprise receiving a first synchronization frame including a first time stamp of said virtual master clock, when said wireless communication device is a client of said group of wireless communication devices, and transmitting a second synchronization frame including a second time stamp of said virtual master clock, when said wireless communication device is a master of said group of wireless communication devices.

25. The product of claim 21, wherein the operations comprise determining said time drift based on one or more time stamps of one or more synchronization frames received from said group of wireless communication devices.

* * * * *